United States Patent [19]
Jaeger et al.

[11] Patent Number: 6,059,404
[45] Date of Patent: May 9, 2000

[54] METHOD AND APPARATUS FOR PRODUCING INK INTENSITY MODULATED INK JET PRINTING

[75] Inventors: C. Wayne Jaeger, Beaverton; Stephen M. Kroon, Sherwood, both of Oreg.

[73] Assignee: Xerox Corporation, Stamford, Conn.

[21] Appl. No.: 08/954,342

[22] Filed: Oct. 17, 1997

Related U.S. Application Data

[63] Continuation-in-part of application No. 08/470,796, Jun. 6, 1995, Pat. No. 5,764,252, and a continuation-in-part of application No. 08/916,588, Aug. 22, 1997.

[51] Int. Cl.$^7$ .................. B41J 2/205; B41J 2/21; B41J 2/175; G01D 11/00
[52] U.S. Cl. .................. 347/88; 347/99; 347/43; 347/85; 347/15
[58] Field of Search .................. 347/88, 99, 43, 347/85, 15, 84

[56] References Cited

U.S. PATENT DOCUMENTS

| | | | |
|---|---|---|---|
| 3,946,398 | 3/1976 | Kyser et al. | 347/70 |
| 4,393,384 | 7/1983 | Kyser | 347/94 |
| 4,494,128 | 1/1985 | Vaught | 347/15 |
| 4,614,953 | 9/1986 | Lapeyre | 347/43 |
| 4,672,432 | 6/1987 | Sakurada et al. | 358/75 |
| 4,889,560 | 12/1989 | Jaeger et al. | 106/27 |
| 5,084,099 | 1/1992 | Jaeger et al. | 106/22 |
| 5,087,930 | 2/1992 | Roy et al. | 347/85 |
| 5,235,350 | 8/1993 | Lin et al. | 347/88 |
| 5,372,852 | 12/1994 | Titterington et al. | 427/288 |
| 5,389,958 | 2/1995 | Bui et al. | 347/103 |
| 5,914,735 | 6/1999 | Yamamoto et al. | 347/88 |

FOREIGN PATENT DOCUMENTS

| | | | |
|---|---|---|---|
| 3284954 | 3/1990 | Japan | B41J 2/175 |

*Primary Examiner*—N. Le
*Assistant Examiner*—Judy Nguyen
*Attorney, Agent, or Firm*—Francis I. Gray; Ralph D'Alessandro

[57] ABSTRACT

A gray scale ink jet printing method and apparatus which produce a high quality images having varying color intensities are disclosed. This is achieved by using a clear phase change ink base and a plurality of colored phase change inks with varying amounts of black dye, thereby producing multiple gray scale levels of black in images with substantial contrast between the imaged and non-imaged areas that are used in medical diagnostic imaging applications.

16 Claims, 4 Drawing Sheets

METHOD AND APPARATUS FOR PRODUCING INK INTENSITY MODULATED INK JET PRINTING

This application is a continuation-in-part of applications Ser. Nos. 08/470,796 entitled "Method and Apparatus For Producing Ink Intensity Modulated Ink Jet Printing" filed Jun. 6, 1995, now U.S. Pat. No. 5,764,252 and 08/916,588 entitled "Phase Change Ink Composition" filed Aug. 22, 1997.

FIELD OF THE INVENTION

This invention relates to ink jet printing and more particularly to a method of printing and an apparatus for providing images having color levels of varying intensity, especially for printing on transparencies used to produce high quality medical images such as X-ray, ultrasound, nuclear medicine, magnetic resonance, computed tomography, positron emission tomography, and angiography.

BACKGROUND OF THE INVENTION

Prior drop-on-demand ink jet printers typically employ one or more inks of a single intensity. Images are formed on a recording medium by ejecting drops of ink from an ink jet head onto the medium. Color ink jet printers typically use four subtractive primary colors of ink: cyan, magenta, yellow and black. Non-primary colors are produced by printing dots of different subtractive primary colors on top of one another. Modulation of the intensity of color of the printed image, hereinafter referred to as gray scale printing, is typically achieved by one of two methods: (1) modulating the diameter or size of each ink dot while leaving the number of dots within a specific area of the image unchanged; or (2) varying the number of dots printed in a specific area without changing the diameter of each individual dot.

Modulation of ink dot size entails controlling the volume of each drop of ink ejected by the ink jet head. The larger the dot size, the darker the color intensity of the printed image. Methods for modulating the volume of ink drops ejected from an ink jet print head are known in the art. For example, U.S. Pat. No. 3,946,398 describes a drop-on-demand ink jet print head that ejects ink drops of variable size in response to pressure pulses developed in an ink pressure chamber by a piezoceramic transducer (PZT). Ink drop volume is modulated by varying the amount of electrical waveform energy applied to the PZT for the generation of each pressure pulse. However, varying the ink drop volume causes variation in the ink drop ejection velocity resulting in drop landing position errors.

U.S. Pat. No. 4,393,384 describes a method for independently controlling both the drop volume and ejection velocity. In order to provide dots small enough for low intensity images, a very small ink jet orifice is required. Such an ink jet print head is difficult to manufacture and clogs easily.

Other approaches have employed a method for controlling the drop volume size and the drop ejection velocity by means of an electric field which accelerates the ink drops in inverse proportion to their volume, thereby reducing the effect of variations in ejection velocity. In addition, the electric field enables formation of an ink drop smaller than the orifice diameter. However, use of the electric field increases the complexity and cost of the printer.

U.S. Pat. No. 5,495,270, issued Feb. 27, 1996 and assigned to the assignee of the present application, discloses an ink jet printer which produces ink drops of differing volumes having substantially the same ejection velocity by providing multiple PZT drive waveforms. The number of different ink drop sizes and therefore the number of gray scale levels which can be produced using this technique is very limited. In addition, the technology required to implement this method is quite complex.

In single ink dot size printing, the printer provides drops of one size which are large enough to provide adequate "solid fill" printing for a given resolution. Color intensity is manipulated by a process referred to as "dithering" in which the perceived intensity of an array of dots is modulated by selectively printing or not printing individual dots within an array thereby varying the number of dots in the specific area. For example, if a 50 percent average intensity is desired, half of the dots in the array are printed. Multiple dither pattern dot densities are possible to provide a wide range of intensity levels. For a two-by-two dot array, five intensity level patterns are possible. An eight-by-eight dot array can produce 65 different intensity levels. Usable gradations of color in an image are thus achieved by distributing a myriad of appropriately dithered arrays across the recording medium in a predetermined arrangement.

However, with dithering there is a trade-off between the number of possible intensity levels and the size of the dot array required to achieve those levels. Increasing the size of the dither cell leads to loss of spatial accuracy due to the lower resolution of the dither patterns. This in turn results in printed images having a grainy appearance.

The Canon FP-510 printer employs ink drops of varying sizes to produce an image of varying color intensity. The Canon FP-510 also uses three different densities of liquid, water soluble cyan and magenta ink (thick, medium and light) to provide up to 64 color gradations. In addition to using liquid ink, the Canon FP-510 can be used only with specially coated roll paper, thereby limiting the versatility of the machine.

In medical diagnostic imaging there is the need for creating images of substantial contrast between the imaged and non-imaged areas and to highlight the differences between different levels of gray obtained when using solid or phase change ink. There still remains the necessity, while using inks of varying intensity to achieve multiple gray scale levels, for long shelf life, and resistance to light.

There thus continues to be a need in the art for a simple, inexpensive and easy-to-use ink jet printer and a method of printing which provides high-resolution gray scale printing, especially in medical diagnostic imaging applications on transparency films, without sacrificing performance and versatility of use.

SUMMARY OF THE INVENTION

An aspect of the present invention is to provide a gray scale ink jet printing method and apparatus that provides high quality images.

Another aspect of the present invention is to provide a gray scale ink jet printing method and apparatus that produces high quality images having a large number of different color intensities without the grainy appearance associated with dithering.

A further aspect of the present invention is to provide a high resolution gray scale ink jet printing method and apparatus which employs conventional ink jet print heads, thereby allowing the use of existing print head technologies.

Yet another aspect of the present invention is to provide such a method and apparatus which can be used to form images on any standard recording medium.

Still another aspect of the present invention is to provide a high resolution gray scale ink jet printer and method of printing using phase change ink compositions that include black coloring agents in thermally stable black colorant systems in conjunction with a clear ink without any coloring agents to provide contrast and highlighting to the imaged areas.

It is a feature of the present invention that the ratio of the dyes comprising the colorant system when incorporated into inks can be adjusted to yield an absorbance spectrum comparable to the absorbance spectrum on silver halide films between about 380 nanometers and about 630 nanometers.

It is another feature of the present invention that the image produced from the phase change inks incorporating the black colorant systems and the clear ink duplicate the silver halide black color perceived by the human eye when observed in the environment in which the medical images are normally viewed on a fluorescent lightbox.

It is another feature of the present invention that the image produced from the phase change inks incorporating black colorant systems and the clear ink produce the desired optical density in the final imaged non-silver halide-containing transparency film for use in medical diagnostic imaging applications.

It is an advantage of the present invention that phase change inks produced from the combining of a process or composite black colorant, such as dye, and another colorant, such as dye, with a phase change ink base and a clear phase change ink can be used in an ink jet imaging system that is environmentally friendly and a relatively low cost alternative imaging system to the chemical wet processing system using silver halide photographic film currently employed in medical diagnostic imaging.

It is another advantage of the present invention that the phase change inks employing the compatible black colorant systems manifest no precipitates or print head ink jet orifice clogging when used in an ink jet printer.

It is another advantage of the present invention that the black colorant systems are compatible in phase change inks when used in an ink jet printer in medical diagnostic imaging applications.

It is a further advantage of the present invention that the black colorant systems are stationary and do not migrate over time in the imaged areas.

It is still a further advantage of the present invention that none of the dyes in the black colorant systems bloom; that is no dye crystallizes and migrates to the surface manifesting itself as a dust-like powder on the surface of the printed image.

These and other aspects, features, and advantages are achieved according to the present invention by printing with different intensity black gray scale phase change inks and a clear phase change ink base, thereby producing multiple black gray scale levels and a contrasting clear area. The formulation of the black gray scale phase change inks either can be performed prior to placement of the black phase change inks in the printer, or can take place within the printer to produce different levels of color intensity during the printing process. The black colorant systems used in the present invention combine a black coloring agent such as a dye having a low absorbance region with at least a second coloring agent such as a dye having a high absorbance region corresponding to the low absorbance region of the black coloring agent to produce inks that are useful in ink jet medical diagnostic imaging applications to create images with black colored regions in the human visible response spectrum of from about 380 to about 670 nanometers. These images are comparable to medical diagnostic images produced using traditional black silver halide photographic film when viewed using a fluorescent light source typically used by radiologists.

BRIEF DESCRIPTION OF THE DRAWINGS

These and other aspects, features and advantages will become apparent upon consideration of the following detailed disclosure of the invention, especially when it is taken in conjunction with the accompanying drawings wherein.

DETAILED DESCRIPTION OF THE PREFERRED EMBODIMENT

As used herein, the following terms will be understood to mean the following:

A compatible black colorant system means at least one coloring agent that is black in color and which is chemically and physically compatible (e.g. non-reactive and soluble) with the phase change ink base and the coloring agents or colorants themselves. It is to be understood that the black coloring agent used in the compatible black colorant system can be a process black (a single colorant) or a composite black (a blend of colorants). Lightfast means the colorant system is resistant to fading upon exposure to light. Thermally stable means the colorant system will not discolor, readily oxidize or otherwise react at operating temperatures of the ink jet printing system.

Low absorbance region and high absorbance region mean the absorbance of light in the low absorbance region in the human visible response spectrum is less than about 80% of the absorbance of light in the high absorbance region of the human visible response spectrum for colorants used in the present invention. This is reflected in the black dye spectrum which has a low absorbance region from about 425 to about 525 nanometers (nm) and has high absorbance regions from about 350 to about 400 nm and from about 550 to about 630 nm. It shall be noted that the human visible response is only significant from about 400 to about 670 nm.

Additionally, compatibility preferably includes colorants that are non-blooming and tinctorially strong. Non-blooming means that no colorant will crystallize and migrate to the surface manifesting itself by a dust-like powder on the surface of the printed image. Non-migrating means that one colorant, such as a dye, will not migrate over time within the imaged areas, for example, from a dark area to a clear or light area. Tinctorially strong means a colorant that produces strong absorbance per unit weight or a very deep (optically dense) color from a minimum amount of colorant. Colorant or coloring agent will be understood to preferably include dyes, but could as well include appropriate pigments, colored isocyanate-derived urethane waxes, polymeric colorants and their derivatives, and colored isocyanate-derived mixed urea/urethane resins.

The phase change inks of the present invention are composed of two parts, namely, a colorant system portion and a phase change ink carrier or base portion, except where clear ink is employed that uses only an uncolored phase change ink carrier or base portion.

The gray scale printing method and apparatus of the present invention employ phase change inks. These inks are in the solid phase at ambient temperature but exist in the liquid phase at the elevated operating temperature of an ink jet printer. In a typical phase change ink jet printer, solid ingots of phase change ink are placed in individual reservoirs. Once the printer is switched on, the ink is heated to above its melting temperature and is maintained in the stand-by phase at approximately 100° C. When the printer enters the ready phase, the ink is heated to approximately 120° C. and passed to the ink jet head, which is maintained at approximately 140° C.

Phase change inks offer several advantages over liquid, water-soluble inks. First, they are easy to store and to handle at room temperature. Second, the problem of nozzle clogging due to ink evaporation is largely eliminated, leading to improved reliability of the printer. In addition, the ink drops solidify immediately upon contact with the recording medium, thereby preventing migration of ink along the medium and improving image quality.

Preferred phase change inks for use in the present invention have high flexibility and high melting points, most preferably about 80° C., thereby improving the durability of the images formed from the inks. In addition, the preferred phase change inks demonstrate low melt viscosity, resulting in increased efficiency of the jetting process. Phase change ink bases suitable for use in the present invention include those described in U.S. Pat. Nos. 4,889,560 and 5,084,099, the disclosures of which are hereby incorporated by reference. Other phase change ink bases are known in the art and may be usefully employed with the present invention.

In a first embodiment of the present invention, ingots of phase change ink having different gray scale levels may be prepared by first heating a colored phase change ink base above its melting temperature. The molten colored ink is then mixed with a clear ink base containing no colorants and allowed to cool to room temperature to form a solid ingot of gray scale ink. By varying the ratio of colored ink base to clear ink base, different levels of color intensity are obtained. The preferred ratio of colored ink base to clear ink base depends on many parameters, such as dye conditions including, for example dye tinctorial strength, drop mass and the kind of ink base used. For example, ratios of 1:4, 1:8, 1:16, 1:32 and 1:64 colored ink base to clear ink base may be used. The resulting ingots of gray scale phase change ink are then employed in a standard phase change ink jet printer, such as a Tektronix Phaser® 300 or Phaser® 350, to produce high resolution images.

High quality monochrome images may be formed according to this method by heating a black phase change ink base to its melting temperature and then diluting the ink with a clear ink base, thereby producing inks of different shades of black. The resulting ingots of black phase change inks are employed in a standard phase change ink jet printer to form high resolution monochrome images. Ingots of clear phase change ink are employed with the ingots of black phase change inks in this method. The use of the clear phase change ink accomplishes complete area coverage with ink and leaves no unprinted areas without ink. The use of the clear phase change ink helps contain the monochrome image formed by the multiple levels of black gray scale ink, prevents dot gain caused by spreading of the black gray scale ink dots, provides contrast and highlights the imaged areas. This technique is particularly useful in medical imaging where a computer generated monochrome image can be printed directly onto a standard recording medium, such as transparency film or alternatively paper, thereby forming a high quality image which is both convenient to view and easy to handle.

The percentage of black colorant system to the phase change ink base is determined by the sufficient amount of black colorant system necessary to achieve the desired absorbance. The percentage of black colorant system to the ink base is from about 0.1 to about 7 parts per hundred parts by weight (0.1%–7%) and more preferably is from about 0.2 to about 4 parts per hundred parts by weight (0.2%–4%).

The colorant portion of the black inks used in the present invention preferably is made up of two or more dyes. One of those dyes is a black dye, such as Color Index (C.I.) Solvent Black 45. Other suitable dyes can include C.I. Solvent Black dyes 22, 27, 28, 29 and 35. The most preferred is C.I. Solvent Black 45. However, any black dye may be acceptable that has the combination of properties of (1) solubility in the phase change ink base portion, (2) thermal stability, and (3) sufficiently lightfastness to be useful for medical imaging applications.

The other colorants of the colorant system of the present invention are primarily chosen because they provide increased absorbance in the deficient low absorbance region of the visible spectrum of the black colorants (i.e. at about 425 to about 525 nm for C.I. Solvent Black 45). Furthermore, these other colorants should also possess sufficient solubility in the phase change ink base portion; thermal stability, compatibility with the black colorant, non-migrating and lightfastness to be of utility in medical imaging applications. Furthermore, it is preferred that this additional colorant or colorants be environmentally safe and non-toxic, have Toxic Substance Control Act (TSCA) registration, be non-blooming, be tinctorially strong, and be commercially available. Two particular dyes, C.I. Disperse Orange 47 and C.I. Solvent Orange 60, are preferred as colorants.

When C.I. Disperse Orange 47 and C.I. Solvent Black 45 are used in combination, it has been found that the parts by weight ratio of C.I. Disperse Orange 47 to C.I. Solvent Black 45 is preferably from about 5 parts to about 10 parts of orange dye per 100 parts of black dye, more preferably, about 7 parts to about 8.5 parts of orange dye per 100 parts of black dye. It is believed that the ratios of the other suitable dyes would be adjusted dependent upon their individual tinctorial strengths.

The resulting absorbance of the colorant system in the phase change ink should be approximately equal throughout the visible spectrum from about 380 nm to about 630 nm (i.e. the absorbance in any one region will be not less than 80 percent of the absorbance in any other region). The functional approach is to balance out the absorbance between the high absorbance and low absorbance regions. This produces a colorant system where the individual dye absorbances of the Solvent Black 45 and the C.I. Disperse Orange 47 are combined, resulting in a substantially balanced absorbance across the portion of the visible spectrum to which humans respond. Furthermore, the inks used in the present invention should possess all of the above recited desired properties of the colorants. Where pigments are employed as the colorant, a dispersant or surfactant may be used to prevent settling or aggregation of the pigments.

In a preferred case, the phase change ink base compositions employed with the particular black inks of desired optical density comprise a tetra-amide and a functional mono-amide compound and a modifying agent which includes a tackifier, a plasticizer, and an antioxidant. The preferred compositional ranges of these phase change ink base compositions are as follows: from about 10 to about 50 and most preferably from about 15 to about 30 percent by weight of a tetra-amide compound, from about 30 to about 80 and most preferably from about 40 to about 55 percent by weight of a mono-amide compound, from about 0 to about 40 and most preferably about 15 to about 35 weight percent of a tackifier, from about 0 to about 30 and most preferably about 4 to about 10 percent by weight of a plasticizer and about 0 to about 2 and most preferably 0.05 to about 1 percent by weight of an antioxidant. These phase change ink bases are described in further detail in U.S. Pat. No. 5,372,852, issued Dec. 13, 1994 and assigned to the assignee of the present invention.

In operation the black gray scale inks and the clear phase change base ink utilized in the process and system of the instant invention are preferably initially in solid form and are then changed to a molten state by the application of heat energy to raise the temperature from about 85° C. to about 150° C. Temperatures above this range will cause degradation or chemical breakdown of the ink over time. The molten inks are then applied in raster fashion from the ink jets in the print head to the exposed surface of the liquid layer forming the intermediate transfer surface, where they are cooled to an intermediate temperature and solidify to a malleable state in which they are transferred to the final receiving surface via a contact transfer by entering the nip between the pressure and fusing roller and the liquid layer forming the intermediate transfer surface on the support surface or drum. This intermediate temperature where the solidified ink is maintained in its malleable state is between about 30° C. to about 80° C.

Once the solid malleable ink image enters the nip, it is deformed to its final image conformation and adheres or is fixed to the final receiving substrate either by the pressure exerted against the ink image on the final receiving substrate by the pressure and fusing roller alone, or by the combination of the pressure and heat supplied by an appropriate heating apparatus. An additional heating apparatus could optionally be employed to supply heat to facilitate the process at this point. The pressure exerted on the ink image is between about 10 to about 2000 pounds per square inch (psi) and more preferably between about 200 to about 1000 psi. The pressure must be sufficient to have the ink image adhere to the final receiving substrate and be sufficiently deformed to ensure that light is transmitted through the ink image rectilinearly or without significant deviation in its path from the inlet to the outlet in those instances when the final receiving substrate is a transparency. Once adhered to the final receiving substrate, the ink image is cooled to an ambient temperature of about 20° to about 25° C. The ink forming the image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C. The indirect printing process described herein is described in greater detail in U.S. Pat. No. 5,389,958 issued Feb. 14, 1995 and assigned to the assignee of the present invention.

Another important property of phase change inks is viscosity. The viscosity of the molten ink must be matched to the requirements of the ink jet print head. For purposes of this invention, the viscosity of the phase change ink is measured on a Bohlin Model CS-50 Rheometer utilizing a cup and bob geometry. It is preferred that the viscosity of the phase change ink composition of the present invention, at about 140° C., is from about 10 to about 16 centipoise (cPs), and more preferably about 12 to about 14 cPs.

The viscosity of the preferred phase change ink composition can be adjusted by adding either more mono-amide or tetra-amide compound. Adding more mono-amide compound will reduce the viscosity, while adding more tetra-amide compound will increase the viscosity.

The final receiving substrate for use with the ink of the present invention can be a variety of media including permeable or impermeable, transparent, semi-transparent or opaque substrates. Where paper is used, the amount of ink deposited by the printer to achieve the same apparent optical density will be approximately half of the amount deposited on a transparent substrate, such as polyester film transparencies. This is because light passes through the ink on paper twice in reflective mode, both going away from and returning toward the eye. In contrast, with a transparency that is viewed in the transmittance mode, light passes through once going toward the eye. The greater dynamic range in the optical density for transparencies compared with reflection prints makes transparencies the preferred medium for medical diagnostic imaging providing distinguishably discernable useful gray levels. Paper has a limited maximum optical density range achievable in reflective mode viewing which does not permit sufficient levels of black to be achieved to be reliably useful in diagnostic applications. However, transparencies are the preferred medium for diagnostic imaging because they are capable of a greater range of optical density compared with reflection prints.

Figure 4:
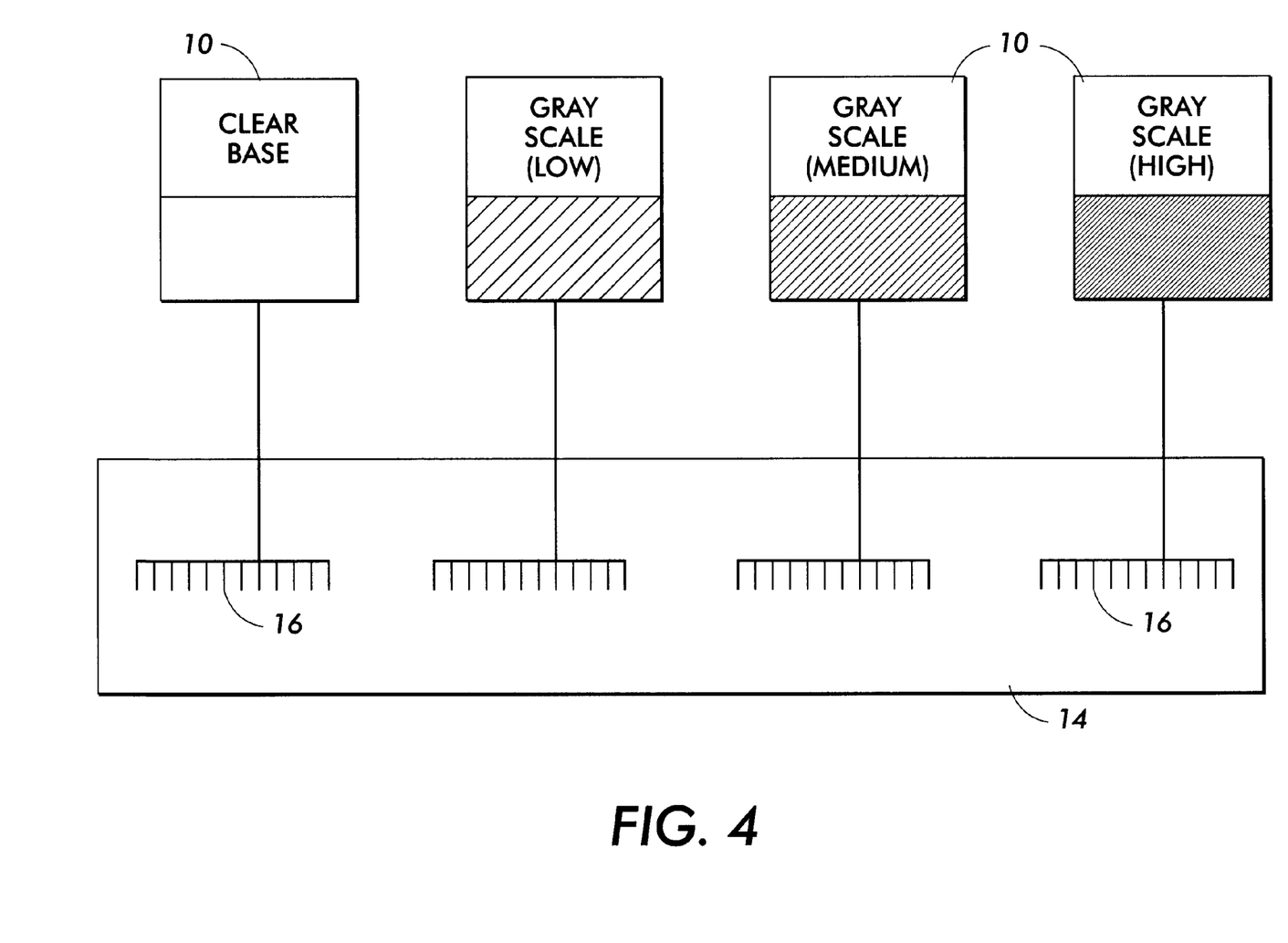
FIG. 4 is a schematic of an alternate embodiment of a four level gray scale ink jet printer of the present invention.

One preferred embodiment of the present invention permits multiple gray levels to be obtained by using inks with four different concentrations of colorant systems individually and mixed by overlapping printing using a printer as shown in FIG. 4. In this embodiment a clear ink using only the base without any of the black colorant system is used in combination with inks having three different percentages by weight of black dye; specifically about 0.41 percent by weight black dye, about 1.18 percent by weight black dye and about 3.15 percent by weight black dye. These dye percentages give inks of low, medium and high optical density black ink, respectively. All of the black inks include the same ratio of orange dye to black dye to obtain a more uniform absorbance across the visible spectrum. In this embodiment, C.I. Disperse Orange 47 dye and C.I. Solvent Black 45 dye are used together. They are used in the same ratio for all inks, preferably the ratio of C.I. Disperse Orange 47 dye to C.I. Solvent Black 45 dye is from about 0.070 to about 0.085 parts of orange to one part of black. This constant ratio of orange dye to black dye simulates the black color obtained in x-ray films using silver halide film for medical imaging. The composite black colorant system of the present invention can be employed whereby individual colorant components can be adjusted to give an absorbance spectrum comparable to that of an image on silver halide film. Preparation of the three level black ink system, not including the clear ink, will have inks of different overall intensities, yet the individual colorant components will have a constant ratio to each other in each of the three inks. The different levels of colorants in the inks used herein allow the generation of multiple levels of optical density. A clear ink base without any black or orange dye is used in medical imaging applications to obtain the dynamic range in optical densities with low, medium and high optical density inks.

Figure 1:
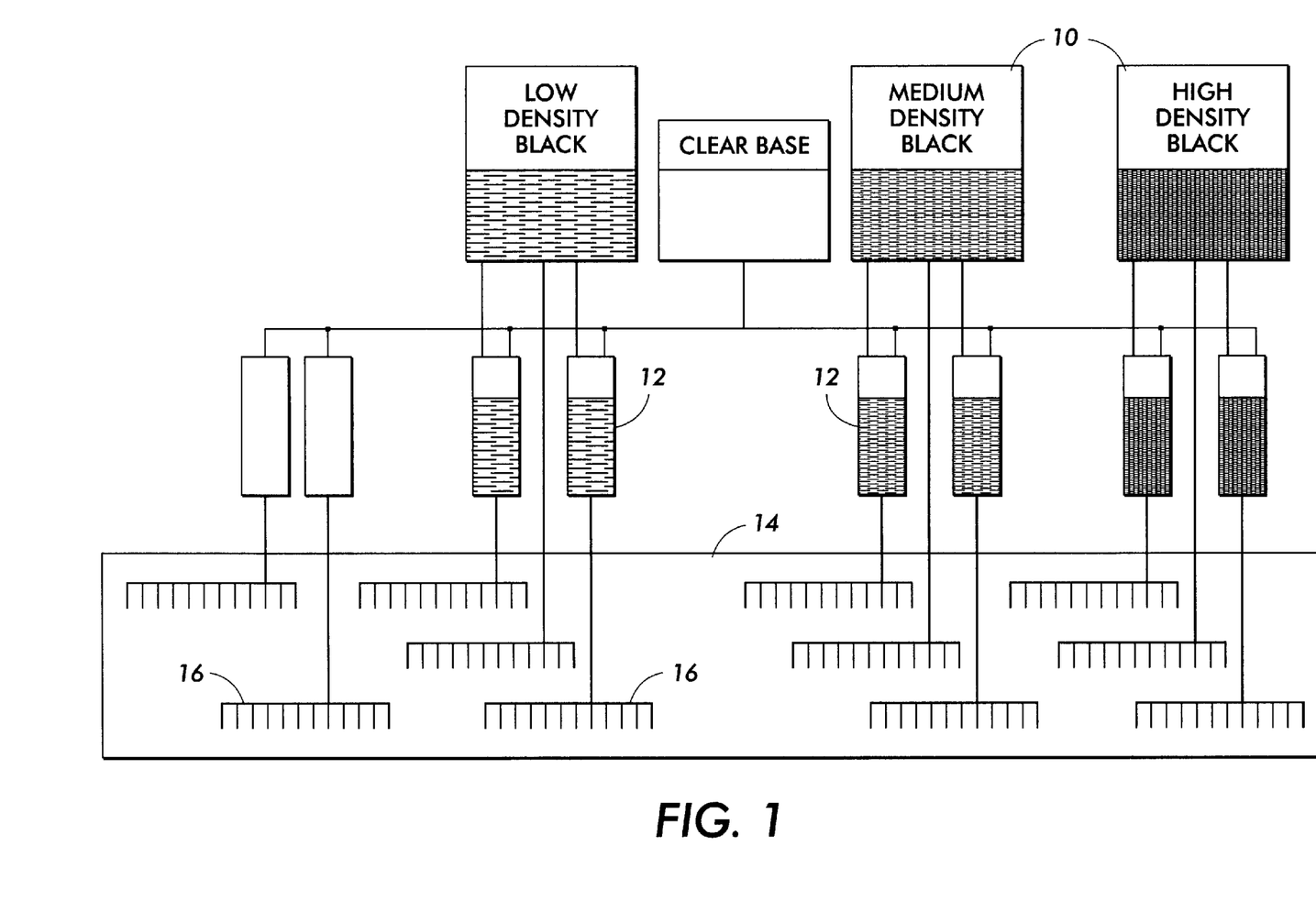
FIG. 1 is a schematic of a four level gray scale ink jet printer of the present invention.

In a second embodiment of the present invention, mixing of colored phase change inks with a clear ink base to provide gray scale levels is performed "on the fly" within a phase change ink jet printer. FIG. 1 is a schematic illustration of a four level gray scale ink jet printer of the present invention. Ingots of three different gray scale level of colors of black phase change ink, namely low, medium, high and black, together with a clear ink base are placed in the printer with each color being placed in a separate conventional ink reservoir 10. The ingots are heated to above the melting point of the inks using standard techniques, and the molten ink is pumped to mixing chambers 12, where black colored ink is mixed with clear ink base to produce multiple gray scale levels. Each mixing chamber 12 is dedicated to producing one level of gray scale ink.

Different gray scale levels of ink are produced by varying the ratio of colored ink to clear ink base. For example, a 1:7 ratio of black ink to clear ink drops will give one gray scale level of black while a 1:32 ratio will give a lighter gray scale level of black.

From mixing chambers 12, gray scale level inks pass to print head 14 where ink dots are ejected from banks of image jets 16 onto a recording medium. Each bank of ink jets is preferably dedicated to one specific gray scale level of ink. An ink jet print head suitable for use with the present invention is disclosed in U.S. Pat. No. 5,087,930, assigned to the assignee of the present application. Other print head designs are well known in the art and may be usefully employed with the present invention.

While the embodiment of the present invention illustrated in FIG. 1 produces three gray scale levels of each black ink, it will be apparent to one of skill in the art that more or fewer mixing chambers can be employed to produce more or fewer gray scale levels. Similarly, fewer black colors may be placed in the printer to provide an image having a reduced range of grayscale levels.

Figure 2A:
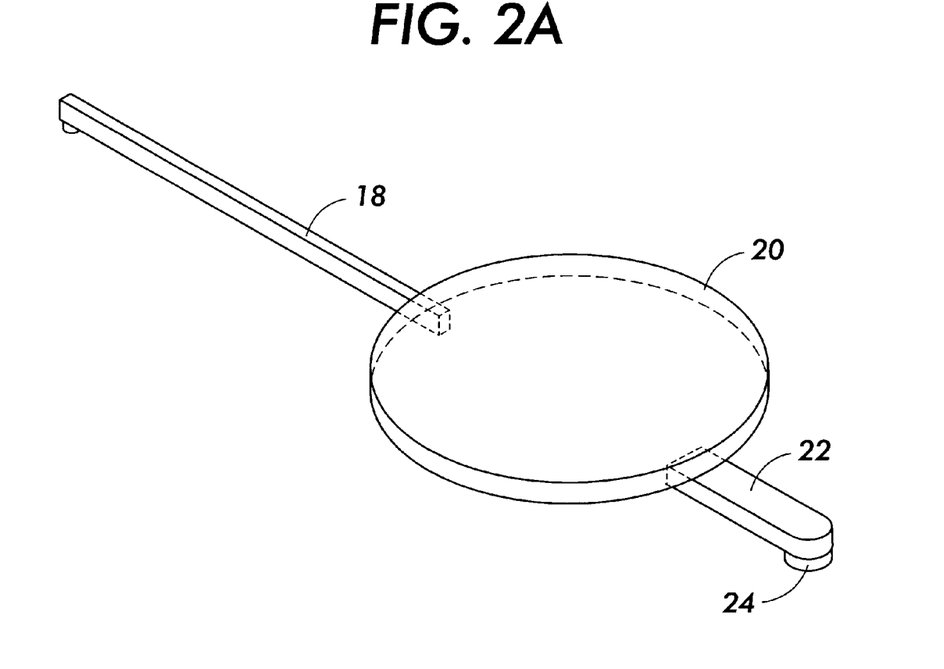
FIG. 2A is an isometric view of a mixing jet of the present invention.

Molten ink is pumped from reservoir 10 to mixing chamber 12 by means of a mixing jet. As shown in FIG. 2A, each mixing jet comprises an inlet channel 18, a pressure chamber 20, an outlet channel 22 with an orifice 24. Ink from reservoir 10 flows through inlet channel 18 and into pressure chamber 20. Ink leaves pressure chamber 20 by way of outlet channel 22 to orifice 24, from which ink drops are ejected.

Figure 2B:
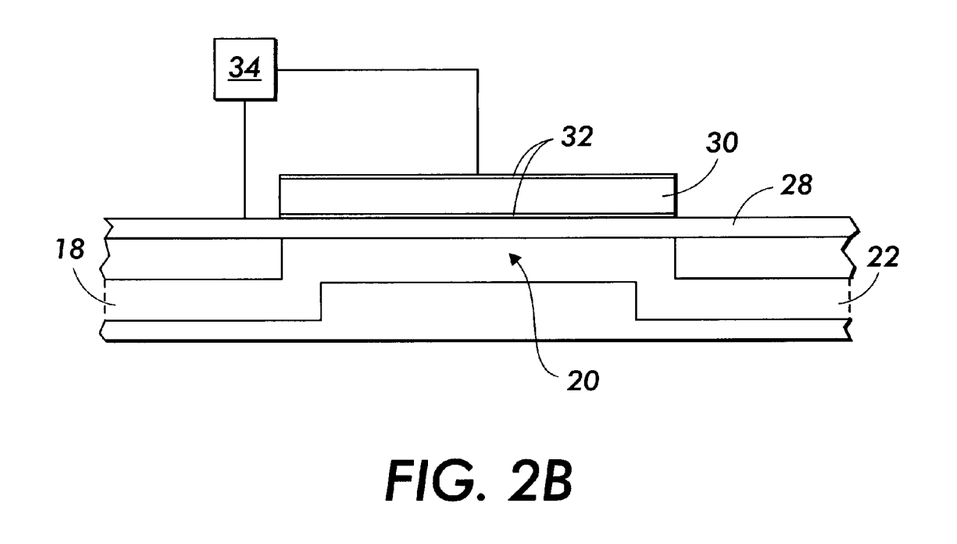
FIG. 2B is a cross-sectional view of a piezoelectric driver of the present invention.

Pressure chamber 20 is operated by an electromechanical transducer mechanism, such as a piezoelectric driver, as shown in FIG. 2B. Ink pressure chamber 20 is bound on one side by a flexible diaphragm 28. An electromechanical transducer 30, such as a PZT, is secured to diaphragm 28 and overlays pressure chamber 20. In a conventional manner, transducer 30 has metal film layers 32 to which an electronic transducer driver 34 is electrically connected. Transducer 30 is typically operated in its bending mode such that when a voltage is applied across metal film layers 32, transducer 30 attempts to change its dimensions. However, because it is rigidly attached to the diaphragm, transducer 30 bends, deforming diaphragm 28 and thereby displacing ink in pressure chamber 20, causing the outward flow of ink through outlet channel 22 to orifice 24. While this embodiment of the present invention has been described with reference to a specific pumping mechanism, other pumping mechanisms which may be usefully employed in this invention are well known in the art. Such pumping mechanisms include electromagnetic actuators, electrostatic ink jets or methods employing mechanical valves.

Figure 3:
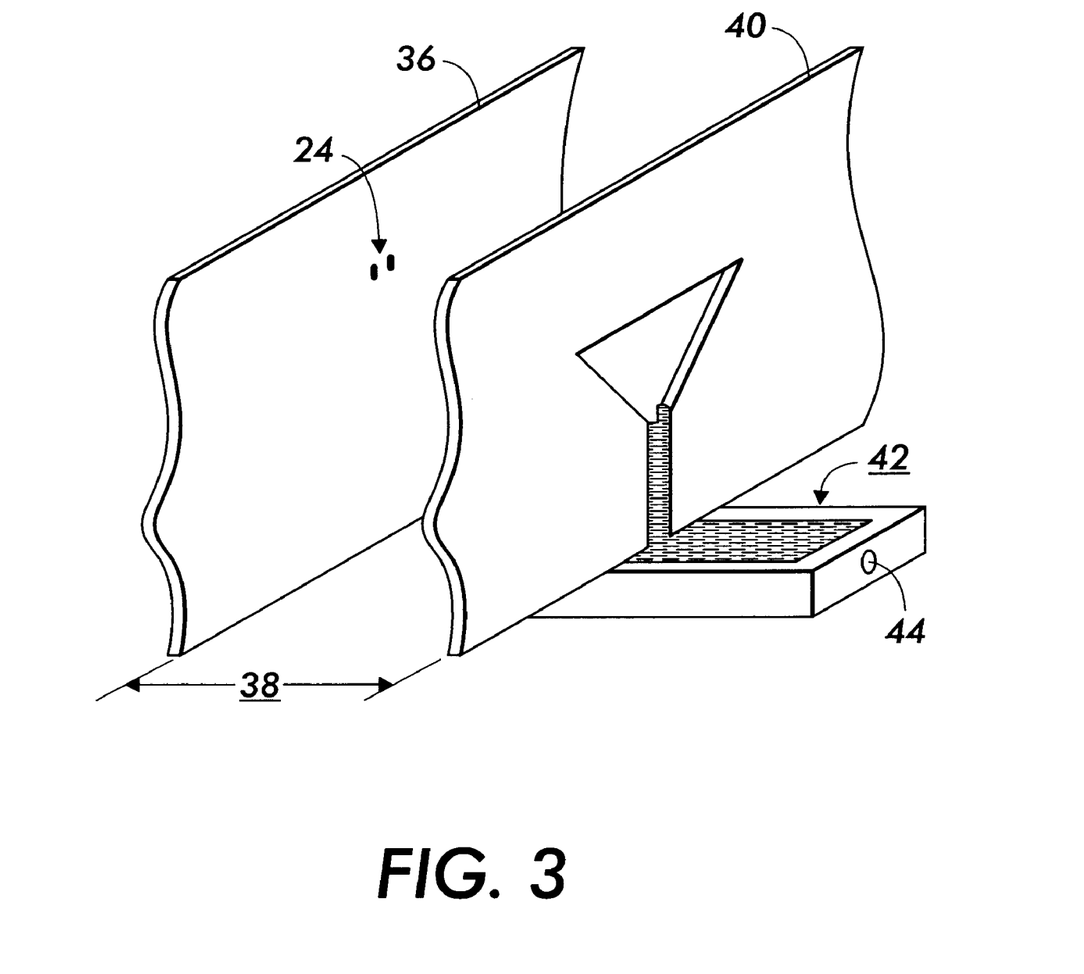
FIG. 3 is a fragmentary, isometric view of a mixing chamber of the present invention.

A mixing chamber of the present invention is illustrated in FIG. 3. Two mixing jets eject drops of ink from orifices 24 in an orifice plate 36 across an air gap 38 onto a mixing plate 40. One jet ejects colored ink while the other ejects clear ink base, thereby preventing the inks from diffusing back into ink reservoirs 10. The ink drops collect against mixing plate 40 and run into a secondary mixing chamber 42. The ink is thereby mixed at mixing plate 40 and in secondary mixing chamber 42. The mixed ink then passes through an aperture 44 to a standard ink jet print head (not shown). The ratio of colored ink to clear ink base is controlled by varying the frequency of the drive waveform applied to the PZT. This is easily achieved using software well known in the art.

To ensure efficient mixing of the colored ink and clear ink base, the drops ejected by the mixing jets are of a small volume, preferably in the range of about 100 to about 10,000 pl, more preferably in the range of about 500 to about 5,000 pl and most preferably in the range of about 1,000 to about 2,000 pl. To avoid pooling of the inks on mixing plate 40 and in secondary mixing chamber 42, secondary mixing chamber 42 preferably has a small volume. In a preferred embodiment, secondary mixing chamber 42 is about 0.508 cm deep and about 0.127 cm long, and narrows from a width of about 0.508 cm at the mixing plate end to about 0.127 cm at the outlet end.

The present invention is further illustrated by the following examples in which Example 1 describes the production of a high quality monochrome image using the first embodiment of the invention and Example 2 describes the design and testing of a mixer jet suitable for use in a second embodiment of the invention. Examples 3–6 show the use of a clear ink base and varying black dye loading to create multiple levels of black gray scale inks and Example 7 shows printing with a clear ink base and multiple levels of black gray scale inks to produce diagnostic quality images on polyethylene film.

EXAMPLE 1

A high resolution monochrome image was formed according to the first embodiment of the present invention as follows.

A standard black phase change ink base commercially available from Tektronix, Inc. of Wilsonville, Oreg. was heated to approximately 135° C. and mixed with a clear ink base in the ratios of 1:4, 1:16 and 1:64 black ink base to clear ink base to produce three different shades of gray ink. The mixed inks were poured into molds and allowed to cool to room temperature. The resulting ingots of gray scale inks, together with an ingot of 100% full strength black phase change ink, were placed in a Tektronix Phaser 300 ink jet printer. A high quality monochrome print requiring no gamma correction was produced employing these gray scale inks.

EXAMPLE 2

A mixing jet for use with clear and black gray scale inks of the present invention was designed as follows.

The necessary flow rate for each mixing chamber 12 is determined by the number of image jets which must be supplied, the repetition rate of the image jets, the size of the image drops and the repetition rate of the mixing jets. The maximum mass flow rate for each chamber would be a full page fill of a single gray scale color. Assuming that each mixing chamber supplies 16 image jets on a print head running in a 1 page per 2 minutes printing mode, generating 200 pl drops, the maximum required flow is calculated as follows:

$$V_{page} = (8.5in)(11in)(300dpi)^2(200\times 10^{-12}l)\left(\frac{1000cm^3}{l}\right) = 1.68cm^3$$

This in turn gives the following mass flow rate for each chamber:

$$m = (1.68cm^3)\left(\frac{0.85g}{cm^3}\right)\left(\frac{1}{2min}\right) = 11.9\frac{mg}{s}$$

This rate is approximately 9 times greater than the flow rate produce by standard image jets. For example, the image jets employed in a conventional print head typically have a flow rate of 1.4 mg/s. Using a one dimensional lumped parameter model, it was calculated that, in order to achieve the maximum required flow rate, a PZT drive with a diameter of 0.635 cm (0.250 in) that displaced 11,000 pl with a nominal ground to peak voltage of 60 volts would be required.

Using current jet design tools well known in the art, it was predicted that a mixing jet of the dimensions shown in Table 1 would produce 2200 pl drops at 2 kHz to give a mass flow rate of 3.8 mg/sec.

TABLE 1

All dimensions in cm

| Feature | Length | Width | Height | Cross Section |
|---|---|---|---|---|
| Inlet channel | 1.27 | 0.0254 | 0.0254 | Circular |
| Pressure chamber | 0.0254 | 0.635 | 0.635 | Circular |
| Outlet channel | 0.216 | 0.0635 | 0.0254 | Rectangular |
| Orifice | 0.01524 | 0.01524 | 0.01524 | Circular |

A mixing jet of these dimensions was constructed and found to produce 1400 pl drops at 1 kHz resulting in a mass flow rate of 1.2 mg/sec. This mass flow rate can be increased by modifying the mixing jet design to gain larger drops at a faster repetition rate or by increasing the number of mixing jets per mixing chamber.

Mixing jets of this design are employed to transfer clear ink base and a colored ink from conventional reservoirs to at least two, preferably four, mixing chambers, where the inks are mixed in the ratios of from about 1:1 to about 1:64 colored ink to clear ink base. The gray scale inks thus formed are passed to a standard ink jet print head and used to form high quality images of variable color intensities.

EXAMPLE 3

A plasticizer[1] (722 grams) and molten stearyl stearamide[2] (3746 grams, and an antioxidant[3] (16.00 grams) were added (in that order) to a pre-heated 110° C. stainless steel container. The components were then mixed with a propeller mixer and a rosin ester resin[4] (1781.92 grams) was slowly added to the mixture over 20 minutes, maintaining a mixture temperature of at least 100° C. A dimer acid-based tetra-amide[5] (1509.84 grams) was then added to the mixture over 15 minutes, while also maintaining a minimum mixture temperature of 100° C. The blend was allowed to mix for 1 hour until all the tetra-amide had dissolved. At this point, an orange dye[6] (16.08 grams) and a black dye[7] (208.01 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middleberg, Conn.
[4] KE-100, glycerol ester of hydrogenated abietic (rosin) acid manufactured by Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 2.60% black dye and 0.197% orange dye in the filtered product. The viscosity of the ink was found to be 12.89 centipoise at 140° C. measured with a Bohlin Model CS-50 Rheometer using a cup and bob geometry. The ratio of absorbance at the 475 nanometer region to the 580 nanometer region for this ink was 0.978:1. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=10.8° C.; storage modulus E'=2.5×10$^9$ dynes/cm$^2$ at 25° C. and 1.5×10$^9$ dynes/cm$^2$ at 50° C.; the integral of log tan δ was 25.4 from about −40° C. to about 40° C. The ink displayed a phase change transition of about 90° C. by the technique of differential scanning calorimetry (DSC) using a TA Instrument DSC 2910 Modulated DSC.

EXAMPLE 4

A plasticizer[1] (217.5 grams) and molten stearyl stearamide[2] (1382.9 grams), and an antioxidant[3] (5.4 grams) were added (in that order) to a pre-heated 110° C. stainless steel container. The components were then mixed with a propeller mixer and a rosin ester resin[4] (579.3 grams) was slowly added to the mixture over 20 minutes, maintaining a mixture temperature of at least 100° C. A dimer acid-based tetra-amide[5] (516.5 grams) was then added to the mixture over 15 minutes, while also maintaining a minimum mixture temperature of 100° C. The blend was allowed to mix for 1 hour until all the tetra-amide had dissolved. At this point, an orange dye[6] (6.8 grams) and a black dye[7] (88.4 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middleberg, Conn.
[4] KE-100, glycerol ester of hydrogenated abietic (rosin) acid manufactured by Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 3.081% black dye and 0.227% orange dye in the filtered product. The ratio by weight of the orange dye to the black dye was 0.074 to 1.0. The viscosity of the ink was found to be 12.88 centipoise at 140° C. measured with a Bohlin Model CS-50 Rheometer using a cup and bob geometry. The ratio of absorbance at the 475 nanometer region to the 580 nanometer region for this ink was 0.970:1. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=10.8° C.; storage modulus E'=2.3×10$^9$ dynes/cm$^2$ at 25° C. and 1.4×10$^9$ dynes/cm$^2$ at 50° C.; the integral of log tan δ was 25.2 from about −40° C. to about 40° C. The ink displayed a phase change transition of about 90° C. by the technique of differential scanning calorimetry (DSC) using a TA Instrument DSC 2910 Modulated DSC.

EXAMPLE 5

A plasticizer[1] (226.8 grams) and molten stearyl stearamide[2] (1229.7 grams), and an antioxidant[3] (5.4 grams) were added (in that order) to a pre-heated 110° C. stainless steel container. The components were then mixed with a propeller mixer and a rosin ester resin[4] (668.6 grams) was slowly added to the mixture over 20 minutes, maintaining a mixture temperature of at least 100° C. A dimer acid-based tetra-amide[5] (567.8 grams) was then added to the mixture over 15 minutes, while also maintaining a minimum mixture temperature of 100° C. The blend was allowed to mix for 1 hour until all the tetra-amide had dissolved. At this point, an orange dye[6] (2.5 grams) and a black dye[7] (33.0 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middleberg, Conn.
[4] KE-100, glycerol ester of hydrogenated abietic (rosin) acid manufactured by Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 1.21% black dye and 0.086% orange dye in the filtered product. The ratio by weight of the orange dye to the black dye was 0.071 to 1.0. The viscosity of the ink was found to be 12.78 centipoise at 140° C. measured in a Bohlin Model CS-50 Rheometer using a cup and bob geometry. The ratio of absorbance at the 475 nanometer region to the 580 nanometer region for this ink was 0.957:1. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=9.0° C.; storage modulus E'=2.3×10$^9$ dynes/cm$^2$ at 25° C. and 1.2×10$^9$ dynes/cm$^2$ at 50° C.; the integral of log tan δ was 27.6 from about −40° C. to about 40° C. The ink displayed a phase change transition of about 92° C. by the technique of differential scanning calorimetry (DSC) using a TA Instrument DSC 2910 Modulated DSC.

EXAMPLE 6

A plasticizer[1] (212.5 grams) and molten stearyl stearamide[2] (1180.2 grams), and an antioxidant[3] (5.4 grams) were added (in that order) to a pre-heated 110° C. stainless steel container. The components were then mixed with a propeller mixer and rosin ester resin[4] (689.0 grams) was slowly added to the mixture over 20 minutes, maintaining a mixture temperature of at least 100° C. A dimer acid-based tetra-amide[5] (614.8 grams) was then added to the mixture over 15 minutes, while also maintaining a minimum mixture temperature of 100° C. The blend was allowed to mix for 1 hour until all the tetra-amide had dissolved. At this point, an orange dye[6] (0.9 grams) and a black dye[7] (11.1 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middleberg, Conn.
[4] KE-100, glycerol ester of hydrogenated abietic (rosin) acid manufactured by Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 0.42% black dye and 0.032% orange dye in the filtered product. The ratio by weight of the orange dye to the black dye was 0.076 to 1.0. The viscosity of the ink was found to be 12.83 centipoise at 140° C. measured with a Bohlin Model CS-50 Rheometer using a cup and bob geometry. The ratio of absorbance at the 475 nanometer region to the 580 nanometer region for this ink was 0.983:1. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=9.5° C.; storage modulus E'=2.3×10$^9$ dynes/cm$^2$ at 25° C. and 1.2×10$^9$ dynes/cm$^2$ at 50° C.; the integral of log tan δ was 27.7 from about −40° C. to about 40° C. The ink displayed a phase change transition of about 93° C. by the technique of differential scanning calorimetry (DSC) using a TA Instrument DSC 2910 Modulated DSC.

EXAMPLE 7

A clear ink unshaded with any colorant system was prepared according to the following procedure and used to obtain the dynamic range in optical densities when employed in an ink jet printer with black shaded low, medium and high optical density inks. A plasticizer[1] (207.9 grams) and molten stearyl stearamide[2] (1169.7 grams), and an antioxidant[3] (5.4 grams) were added (in that order) to a pre-heated 110° C. stainless steel container. The components were then mixed with a propeller mixer and a rosin ester resin[4] (711.0 grams) was slowly added to the mixture over 20 minutes, maintaining a mixture temperature of at least 100° C. A dimer acid-based tetra-amide[5] (605.8 grams) was then added to the mixture over 15 minutes, while also maintaining a minimum mixture temperature of 100° C. The blend was allowed to mix for 1 hour until all the tetra-amide had dissolved. The clear ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middleberg, Conn.
[4] KE-100, glycerol ester of hydrogenated abietic (rosin) acid manufactured by Arakawa Chemical Industries Inc. of Osaka, Japan
[5] UNIREZ 2970, manufactured by Union Camp Corporation of Wayne, N.J.

The viscosity of the clear ink was found to be 12.79 centipoise at 140° C. measured with a Bohlin Model CS-50 Rheometer CS-50 using a cup and bob geometry. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature $(T_g)$=11.1° C.; storage modulus $E'$=2.1×10$^9$ dynes/cm$^2$ at 25° C. and 1.1×10$^9$ dynes/cm$^2$ at 50° C.; the integral of log tan δ was 27.0 from about −40° C. to about 40° C. The ink displayed a phase change transition of about 94° C. by the technique of differential scanning calorimetry (DSC) using a TA Instrument DSC 2910 Modulated DSC.

The following procedures were used to obtain the visible absorbance spectra of the ink samples in Examples 3–7 and for determining the dye content of those samples.

A solution of the orange shaded black ink was prepared by weighing about 0.16211 grams of the ink of Example 3 into a 250 mL volumetric flask. The ink was dissolved in n-butanol. When the ink was completely dissolved, the volumetric flask was filled to volume with n-butanol. The solution was thoroughly mixed. The absorbance spectrum of the sample was measured against a reference cell containing the solvent, n-butanol, in a dual beam Perkin-Elmer Lambda 2S UV-Visible Spectrometer scanning from 350 nm to 750 nm. The absorbances at 580 nm and 475 nm were used to calculate the actual amounts of the two dyes incorporated into the ink after filtering.

DETERMINATION OF BLACK DYE CONTENT IN INKS CONTAINING THE BLACK COLORANT SYSTEM

In the visible absorbance spectrum of the ink of Example 3, the absorbance at 580 nm is 0.5104 for 0.16211 grams of the ink sample in 250.0 mL of n-butanol. The spectral strength was 787 mL A/gram (where A=absorbance). A commercially available black ink for the Phaser® 340 and 350 color printers containing 2.344% C.I. Solvent Black 45 dye has a spectral strength of 710 mL A/gram. Therefore the ink of Example 3 contains 787/710×2.344%, or 2.60% black dye.

DETERMINATION OF ORANGE DYE CONTENT IN INKS CONTAINING THE BLACK COLORANT SYSTEM

The absorbance at 580 nm in the visible spectrum of the ink in Example 3 is 0.5104, and is due entirely to the black dye. No portion of the orange dye absorbs in this region of the spectrum. The ink containing only black dye has an absorbance at 475 nm that is 64.82% of its 580 nm absorbance. Therefore the absorbance at 475 nm in the spectrum attributable to the black dye is 0.5104 times 0.6482 or 0.3308. Since the absorbance in the visible spectrum of the ink of Example 3 is actually 0.4991, the additional absorbance is due entirely to the amount of orange dye that is present, or 0.4991−0.3308=0.1683. The orange dye was determined from using the aforementioned spectrometer to have an absorbance of 0.527 for every 1 mg of dye in 250 mL of n-butanol. Therefore, the amount of the orange dye in the black colorant system must be 0.1683/0.527=0.319 mg. A sample size of 162.11 mg of the ink of Example 3 was used to generate the visible spectrum. Therefore the orange content of the sample of the ink of Example 3 is 0.319 mg divided by 162.11 mg or 0.197% orange dye in the black ink. The ratio of orange to black dyes is 0.197 to 2.60 or 0.076 to 1.00.

THERMAL STABILITY TESTING

An ink the same as described in Example 3 above was heated for 408 hours in a glass beaker with a simulated print head reservoir in an oven at about 145° C. The spectral strength (milliliters Absorbance per gram) decreased from about 771 to 645 or alternatively, the ink lost about 16.3% of its initial dye strength. This compares very favorably with actual operating conditions where it can be expected that the ink would be subjected to the elevated operating temperature in the print head of about 140° C. for at most and routinely less than about 8 hours.

COMPATIBILITY TESTING

The black and orange dyes from Examples 3–6 were found to be mutually compatible when used in a Tektronix Phaser® 350 printer with a modified print head in which the cyan, yellow, magenta and black colors were replaced by the clear, low, medium and high optical density inks of Examples 7, 6, 5 and 4, respectively. No clogging of any of the orifices of the ink jet print head was observed, even with multiple purging/wiping cycles in the printer or even with extended dwell time of the test inks in the printers.

No reaction occurred among these inks and no precipitates were formed in the inks on or around the print head surface during multiple normal purging cycles while the printer was in operation.

ADHESION DURABILITY TESTING

Samples of the inks in Examples 3–7 and a commercially available black ink used in a Tektronix Phaser® 350 color printer were tested for adhesion durability on transparent films or substrates routinely used for fluorescent lightbox viewing in medical diagnoses as follows. The first set of data is for a sample that was imaged twice, first with the ink of Example 3 and then with the ink of Example 5 to achieve 125% coverage of the imaged area. The remaining samples were imaged just once with the indicated ink of high, medium, low and clear optical density, and with commercially available black ink to compare adhesion to the transparent film substrate.

A small test fixture that holds tautly a 1.9" square imaged sample of a 100% solid fill phase change ink on a transparency final receiving substrate was utilized for each test. A round approximately ½ inch diameter and approximately ¼ inch raised plastic head mounted on a flat metal spring impacts the media or non-imaged side of the sample centered vertically and just above the midpoint. The hammer is driven by a 3–5 inch long, 7/16 inch wide and about 0.0035 inch tick metal spring that is cocked back about 1 inch using a trigger and release method. The sample is secured by two upright poles on either side that clamp the sample along the entire length of each side by sandwiching the sample between the upright and another piece of bracket. The amount of ink remaining on the imaged transparency substrate after impact is determined by use of a software image analysis program and a flat bed scanner that first scans a selected area (a 1.4×1.09" rectangle) of the hammer impacted image at a resolution of 439 dots per inch and then analyzes the scanned area. The software program then calculates the percentage of ink that has been removed from the scanned rectangular area which permits an interpolation to be done to provide the percentage of ink remaining on the transparency substrate as shown in Table 2.

GOUGE DURABILITY TESTING

Durability testing for gouging of solid fill phase change ink imaged transparency substrates using samples of the inks and printing method for the samples described above for adhesion durability testing was performed as follows. A variable weight gouge test fixture was employed which is composed of three arms with weighted gouge fingers and a metal plate to which a print sample is secured. The metal plate moves the imaged print beneath the gouge fingers.

A print with a 100% solid fill image (at least 10" long and wide enough for up to six interlaced scratch passes of the gouge fingers, each pass about 2 inches in width) on transparency substrate was secured to the metal moveable plate so the gouge was along the length of the substrate on the ink image side. The three gouge fingers have a net weight of 924, 660, and 396 grams, respectively, during the first gouge. Each gouge finger is 0.5" wide by 1.245" long with a point of contact curve equivalent to a 0.995" diameter disc. The disc is free of any ink particulate prior to all gouging. The gouge fingers are gently lowered at one end of the imaged portion of the substrate so that the gouge finger edges make a contact angle of approximately 75° along the leading edge of the gouge and approximately 15° along the trailing edge (i.e. the image was pulled against the gouge fingers, not pushed). The moveable metal plate was advanced for 9±1/32 inches at a speed of 0.45±0.05 inches/second. A second gouge was performed on the transparencies on the same print samples with the three gouge fingers containing a net weight of 1188, 1056, and 792 grams, respectively.

The sum of the areas of the resulting six gouges for each transparency media are measured in $mm^2$ using the flat bed scanner and imaging analysis software system described above with respect to adhesion durability testing. The area with ink removed is shown in Table 2.

Nos. 5,830,942 entitled "Phase Change Ink Formulation Using Urethane and Urethane/Urea Isocyanate Derived Resins," issued Nov. 3, 1998 and 5,919,839 entitled "Phase Change Ink Formulation Using an Isocyanate-Derived Wax and a Clear Ink Carrier Base, issued Jul. 6, 1999, both assigned to the assignee of the present invention. The combination of the ink carrier or base composition and the compatible black colorant system can be used with either a direct printing or an indirect transfer or offset printing printer. Also the phase change inks employing the colorant system of the present invention can be use in conjunction with an adhesion promoting coating that is applied to the transparent substrate prior to imaging. It should be noted that the present invention may be usefully employed in combination with various prior art techniques for obtaining variations in color intensity, including dithering and variation of ink drop size to provide enhanced gray scale image resolution and quality. All patents and patent applications referenced herein are hereby specifically incorporated by reference in pertinent part. Although the present invention has been described in terms of specific embodiments, changes and modifications can be carried out without departing from the scope of the invention which is intended to be limited only by the scope of the appended claims.

What is claimed is:

1. A method for generating a printed image having variable color intensities comprising the steps of:
    a) mixing a black colored phase change ink with a clear ink base in a plurality of ratios, wherein the ratios are selected to form desired gray scale level black inks;

TABLE 2

|  |  | Example 3/5 High/Inter 125% fill | Example 4 High Optical Density | Example 5 Intermediate Optical Density | Example 6 Low Optical Density | Example 7 Clear | Phaser ® 350 printer black ink |
| --- | --- | --- | --- | --- | --- | --- | --- |
| Adhesion Durability (Higher is Better) | % | 99.85 | 99.87 | 99.86 | 100.00 | 100.00 | 96.56 |
| Gouge Resistance (Lower is Better) | $mm^2$ | 2481.42 | 2406.78 | 2243.97 | 2232.62 | — | 3433.02 |

The results show that the black shaded inks in Examples 3–6 and the clear ink in Example 7 provide better adhesion durability on transparency media than the current commercially available black Tektronix Phaser® 350 ink and the twice imaged or over-printed sample, and that the black shaded inks in Examples 4–6 also display better gouge resistance.

Having illustrated and described the principles of our invention in a preferred embodiment thereof, it should be readily apparent to those skilled in the art that the invention can be modified in arrangement and detail without departing from such principles. For example, the ink base or carrier composition to form the ink composition of the present invention can be a low viscosity semicrystalline or crystalline amide wax, an ester wax, a polyethylene wax, a microcrystalline wax or a paraffin in combination with a hydrocarbon or resin based amorphous material, or an oligomer, or low molecular weight polymer or copolymer, or a tackifier, or a plasticizer and combinations thereof. In addition, the phase change ink base or carrier composition can comprise isocyanate-derived urethane resins, isocyanate-derived urethane/urea mixed resins, isocyanate-derived urethane waxes, and combinations thereof as disclosed in U.S. Pat.

b) forming solid ingots of the gray scale level black inks;
   c) forming solid ingots of the clear ink base;
   d) placing the solid ingots of the gray scale level black inks and the clear ink base in a plurality of ink reservoirs fluidically coupled to a drop-on-demand phase change ink jet printer print head;
   e) melting the solid ingots of gray scale level black inks and the clear ink base in the ink reservoirs and feeding the gray scale level black inks and the clear ink base to the print head; and
   f) ejecting the drops of the gray scale level black inks and the clear ink base from the print head onto a recording medium at a plurality of locations to generate the printed image.

2. The method of claim 1 wherein the black colored phase change ink is mixed with the clear ink base in the ratios of 1:4, 1:16 and 1:64 to provide three different gray scale level black inks.

3. The method of claim 1 wherein the black colored phase change ink is mixed with the clear ink base to provide three different gray scale level black inks having percentages by weight of black dye of about 0.41, about 1.18 and about 3.15.

4. A method for generating a gray scale printed image having variable color intensities comprising the steps of:

a) providing a clear phase change ink base and a plurality of colored phase change inks of different gray scale levels;

b) feeding the clear phase change ink base into a first ink reservoir and the plurality of colored phase change inks into a corresponding plurality of separate ink reservoirs in a drop-on-demand phase change ink jet printer having a print head fluidically coupled to the ink reservoirs;

c) melting the colored phase change inks of different gray scale levels and the clear phase change ink base; and    d) ejecting drops of the color phase change inks of different gray scale levels and the clear phase change ink base from the print head onto a recording medium at a plurality of locations to generate the gray scale printed image having variable color intensities.

5. The method of claim 4 wherein each colored phase change ink of different gray scale levels is a different shade of black and the generated gray scale printed image is a monochrome image.

6. The method of claim 4 wherein a black colored phase change ink is mixed with the clear phase change ink base to provide three different gray scale levels of the colored phase change inks having percentages by weight of black dye of about 0.41, about 1.18 and about 3.15.

7. A drop-on-demand ink jet printer for generating a printed image having variable color intensities comprising:

a) a first ink reservoir for hold a clear phase change ink base;

b) a plurality of reservoirs for holding a corresponding plurality of colored phase change inks, each colored phase change ink having a different gray scale level, the colored phase change inks having specific ratios of coloring agents to the clear phase change ink base wherein the ratios are selected to form the different gray scale levels; and    c) means for transferring the clear phase change ink base and the colored phase change inks of different gray scale levels to a print head for ejecting drops of the clear phase change ink base and the colored phase change inks of different gray scale levels onto a recording medium at a plurality of locations to generate the printed image.

8. The drop-on-demand ink jet printer of claim 7 wherein the colored phase change inks of different gray scale levels are shades of black and the printed image is monochome.

9. The drop-on-demand ink jet printer of claim 8 wherein the monochrome printed image is a medical diagnostic image.

10. The drop-on-demand ink jet printer of claim 9 wherein the recording medium is a transparency.

11. The drop-on-demand ink jet printer of claim 10 wherein a black phase change ink is mixed with the clear phase change ink base to provide three different gray scale levels of the colored phase change inks having percentages by weight of black coloring agent of about 0.41, about 1.18 and about 3.15.

12. The drop-on-demand ink jet printer of claim 11 wherein the black coloring agent is selected from the group consisting of dyes, pigments, and waxes.

13. The drop-on-demand ink jet printer of claim 12 wherein the black coloring agent is a dye.

14. The drop-on-demand ink jet printer of claim 11 wherein the black phase change ink includes a black coloring agent and at least one other colorant.

15. The drop-on-demand ink jet printer of claim 14 wherein the at least one other colorant is a dye.

16. The drop-on-demand ink jet printer of claim 15 wherein the dye is C.I. Disperse Orange 47.

\* \* \* \* \*